Sept. 19, 1967  R. J. COREY  3,342,044
NON-RUN REVERSIBLE KNIT-WEAVE
Filed Nov. 14, 1963  14 Sheets-Sheet 1

INVENTOR.
Robert J. Corey
BY *Lucke & Lucke*

Sept. 19, 1967     R. J. COREY     3,342,044

NON-RUN REVERSIBLE KNIT-WEAVE

Filed Nov. 14, 1963     14 Sheets-Sheet 2

INVENTOR.
Robert J. Corey
BY

Sept. 19, 1967 R. J. COREY 3,342,044
NON-RUN REVERSIBLE KNIT-WEAVE
Filed Nov. 14, 1963 14 Sheets-Sheet 3

INVENTOR.
Robert J. Corey
BY Lucke & Lucke

Sept. 19, 1967     R. J. COREY     3,342,044
NON-RUN REVERSIBLE KNIT-WEAVE
Filed Nov. 14, 1963     14 Sheets-Sheet 4

INVENTOR.
Robert J. Corey

INVENTOR.
Robert J. Corey

Sept. 19, 1967  R. J. COREY  3,342,044
NON-RUN REVERSIBLE KNIT-WEAVE
Filed Nov. 14, 1963  14 Sheets-Sheet 6

INVENTOR.
Robert J. Corey
BY Lucke + Lucke

FIG. 20

Sept. 19, 1967   R. J. COREY   3,342,044
NON-RUN REVERSIBLE KNIT-WEAVE
Filed Nov. 14, 1963   14 Sheets-Sheet 9

FIG. 22
FIG. 21

INVENTOR.
Robert J. Corey
BY

Sept. 19, 1967  R. J. COREY  3,342,044
NON-RUN REVERSIBLE KNIT-WEAVE
Filed Nov. 14, 1963  14 Sheets-Sheet 12

INVENTOR.
Robert J. Corey
BY Lucke & Lucke

INVENTOR.
Robert J. Corey
BY

United States Patent Office 3,342,044
Patented Sept. 19, 1967

3,342,044
NON-RUN REVERSIBLE KNIT-WEAVE
Robert J. Corey, c/o J. Wall, Box 588A, R.D. 1,
Dover, N.J. 07801
Filed Nov. 14, 1963, Ser. No. 323,635
9 Claims. (Cl. 66—169)

This invention relates to a new weave for knitting a new type of woven fabric. In particular, the invention relates to a non-run reversible weave for fine yarns such as nylon, but is not restricted to such use or to the thinness or thickness of yarns used in such fabrics.

More particularly, the new weave, endowed with the elasticity of a tricot weave although entirely different in structure, lends itself to the fabrication of sheer stockings and form-fitting garments in which two directional stretch is required.

The tricot weave with its two-way stretch revolutionized the knitting industry and paved the way for world famous form fitting American nylon stockings. The tricot weave, based upon a vertically woven series of looped stitches is vulnerable in the line of stress, being devoid of resistance to two-directional vertical runs when even one stitch is broken.

None of the self-termed "non-run" or "runproof" fabrics known in the art have proven such claimed characteristics in actual use, especially when fabricated into so called "silk" stockings. At best, conventional weaves are only run-resistant. Such resistance is usually obtained by the use of thicker weaves consisting of two or more threads with reliance on stopping runs placed on snagging such thicker yarns. Some weaves have elongated lock loops, floating extensions of which create an uneven appearance and are particularly vulnerable to unsightly snagging. Other weaves have alternate courses of tight and loose stitches to obtain the elasticity required for hosiery, but such uneven patterns are not attractive.

An object of the invention is to develop a weave which has all of the advantages of the conventional tricot weave, but none of its disadvantages.

Another object of the invention is to develop a sheer weave which will positively not run under any circumstances, even if it is severely cut or torn.

Yet another object of the invention is to develop a single and multiple thread woven structure which is not only elastic in both a lengthwise and widthwise direction, but also resistant to the line of stress to prevent vertical runs when manufactured into sheer stockings and the like.

A further object is to develop a weave which may be woven in both flat and tubular form, thus insuring unlimited scope of utility.

A still further object is to develop a weave which is reversible, i.e., has the same pattern and design on both sides of the fabric. By eliminating a right and wrong side to garments such as hosiery its life will be extended due to more equal distribution of wear on such opposing surfaces.

Yet another object is to develop a weave the basic pattern of which may be modified to produce varying degrees of two way elasticity.

The features and characteristics of the new knit weave forming the invention fulfill all of the above stated objects by being runproof, elastic, adapted to both flat and tubular construction of reversible fabrics including hosiery.

The basic weave of the invention contemplates a single thread woven horizontally into a course of alternate upward and downward facing loops in a one row step up basis. During the process of weaving a second and each succeeding course the thread or yarn is intertwined over and under the legs of the loop immediately below it. By interlocking both legs of each loop it is impossible for a run or ladder to result when a loop is broken, no matter where the break might occur.

The invention also embraces modifications of the above basic weave which consist of a series of alternate upstanding and inverted funnel shaped loops in which the same interlocking stitch is used. These modifications are woven on a two or more row step up basis which gives it a correspondingly multiple degree of elasticity both lengthwise and widthwise to that of either the above described basic or conventional tricot weaves.

Both the basic one row step up and the modied two or more row step up weaves are advantageously made in both flat and tubular form, both forms having alternate wales of upwardly facing and downwardly facing open loops, but the modications are provided with intermediate rows of reversible closed, square shaped stitches between each wale or column of loops.

It will be seen that since the stitches in each course are not only joined horizontally but interlocked horizontally by each succeeding course, maximum resistance to the vertical stress causing runs in conventionally woven fabrics is obtained.

Further features and advantages of the invention will be apparent in the following detailed description and the accompanying drawings which illustrate preferred embodiments of the invention, wherein.

Figure 1:
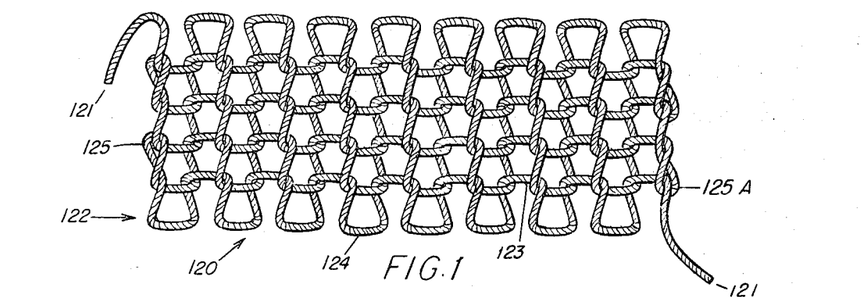
FIG. 1 is an enlarged view of a section of a novel fabric in flat form made in accordance with the invention and illustrates a new type of vertically knit-woven stitches, made one stitch at a time and the manner of interlocking one course of such stitches with each preceding course.

Referring now to the drawings, FIG. 1 shows a flat knitted blank of the new weave identified generally as 120. The blank is made from a single thread 121 woven horizontally into a first course 122 of alternate regular or downwardly facing loops 123 and inverted or upwardly facing loops 124 on a one row step up basis.

A selvage edge 125, which is necessary in all finished knit flat woven fabrics, is formed on both edges as the single thread knitting proceeds from the first course to each succeeding course 125a. When the second course of identical loops are woven, the thread moves horizontally in the opposite direction to that of the first or preceding course and in so doing is twisted or intertwined under the first leg and over the second leg of the loop immediately below it to positively interlock both ends or corners of the bight portion of each regular loop 123. A cheaper, faster weave can also be produced with a raw edge hereinafter described, for articles to be made from sewn, cut fabric.

Figure 2:
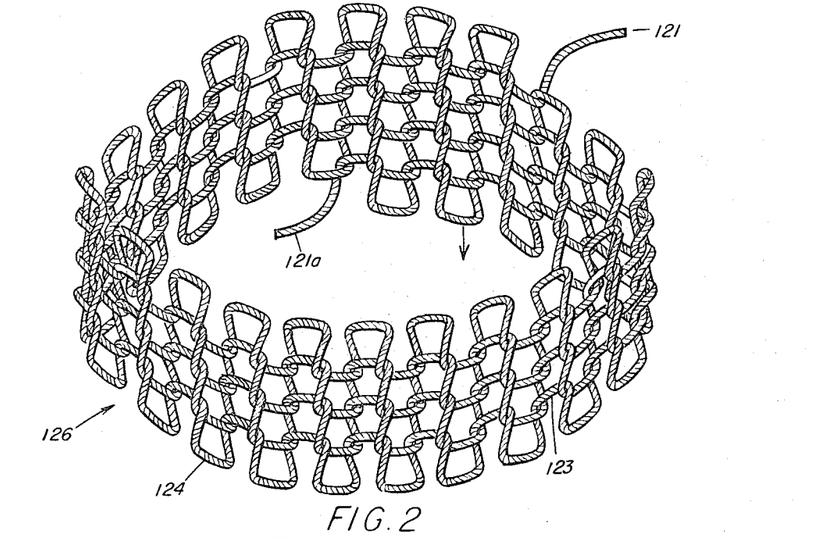
FIG. 2 is an enlarged view of a section of the same type of fabric shown in FIG. 1 but made one stitch at a time in tubular form such as used to make full fashioned hose.

This new weave which has the same elastic characteristics as tricot both lengthwise and sidewise is capable of being woven in tubular form as required in the manufacture of full fashioned knit hose. The tubular section illustrated in FIG. 2 is generally designated 126 and is made by weaving one thread 121a in continuous circles, the dimensions of which may remain constant, diminish or increase to conform to any desired pattern.

Figure 3:
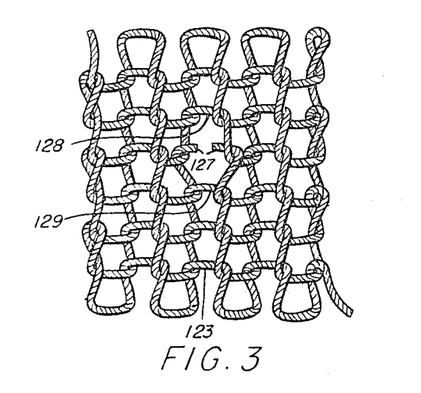
FIG. 3 is an enlarged view of a flat woven section such as shown in FIG. 1 and is the first in a series of figures illustrating the self-adjusting steps which occur when an interlocked loop is broken.
Figure 4:
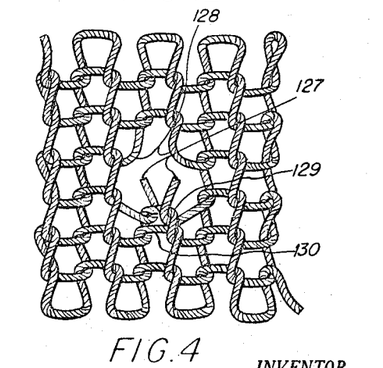
FIG. 4 is a sequence view similar to that of FIG. 3 and shows the ends of the broken thread, separated from the horizontal loop directly above it, being initially clamped between the next two horizontal loops directly beneath it, thus preventing a run from starting.
Figure 5:
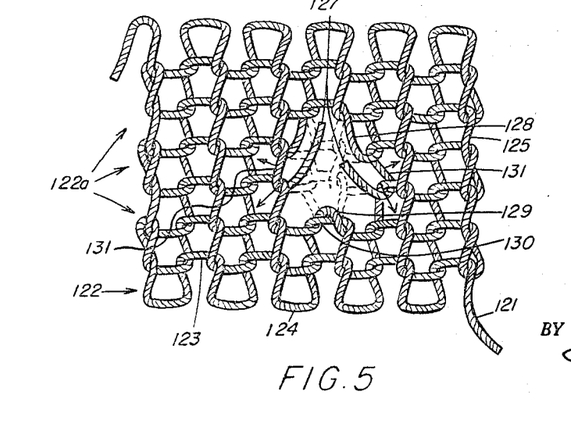
FIG. 5 is a sequence view similar to that of FIGS. 3 and 4. In this view, the ends of the broken loop have escaped from the initial vertical clamping action only to be subjected to a further and more positive vise effected by the lateral pull of adjacent loops in its respective horizontal course. The tightening action shown on the right is a subsequent phase to that shown on the left and is the final stage of a broken thread end.

FIGS. 3 to 5 illustrate the manner in which components of the knit weave, whether in flat or tubular form, automatically adjust structurally from original loop formation to an interlocked clamping position to prevent runs.

In FIG. 3 a regular loop or stitch 123 has been severed to form two broken ends 127. Normal lateral tension will pull the two separate ends from the upper vertically interlocked loop 128. This loop, which is directly above, remains intact in its horizontally woven course as clearly shown in FIGS. 4 and 5.

In FIG. 4 the broken ends 127, 127 are initially caught by loop 129, directly below the broken stitch, as it is pulled downwardly to overlap the next lower stitch 130. Both stitches 129 and 130 remain intact and no amount of vertical stress or strain could possibly cause a run in a column or wale containing a break or tear such as is indicated by severed stitch 127.

FIG. 5 indicates the steps preceding final clamping of the severed ends. Each end is shown in the process of being locked in its next adjacent horizontal loop when such loops 131, 131 are pulled laterally in a direction away from the break. The ends 127, 127 will remain in a final tightly locked position to restrict the break to an area within its immediately surrounding unbroken loops. The position of stitch 130 shows how the column in which the break occurred is blocked from running in a downward direction, and that of stitch 128 shows how the same column is blocked from running in an upward direction.

Figure 6:
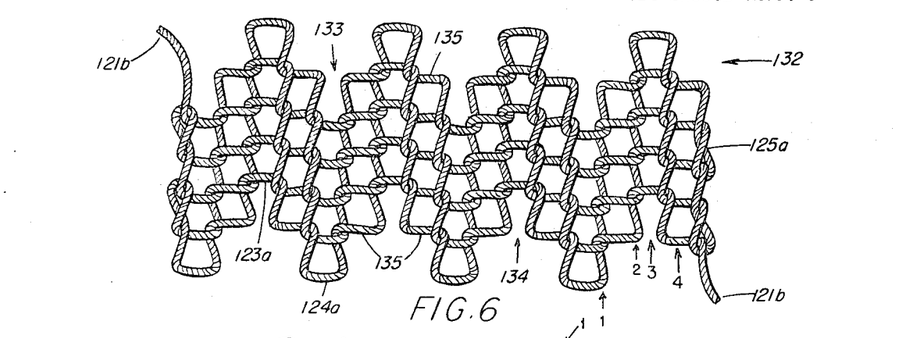
FIG. 6 is an enlarged view of a section of a modification of the novel fabric shown in FIG. 1 in which the same interlocking principle is used on deeper courses of vertically woven loops to double the degree of two-way elasticity obtainable in the basic weave.

A modified weave having the physical characteristics of twice the degree of elasticity of the basic weave above described, and of conventional tricot weaves, is shown in FIG. 6 and designated generally as 132. This section of fabric is shown knit woven in flat form with a single thread 121b, similar selvage edges 125a, regular loops 123a and inverted loops 124a. This modified weave, however, is a four column weave which forms a series of alternate upright and inverted funnel shaped units, designated 133, 134 respectively. This doubly elastic weave is thus made on a two row step up and two row step down basis, repeating after two steps up and two down, with an intermediate column of square shaped stitches 135 between each wale of regular or inverted loops 123a, 124a respectively.

Figure 7:
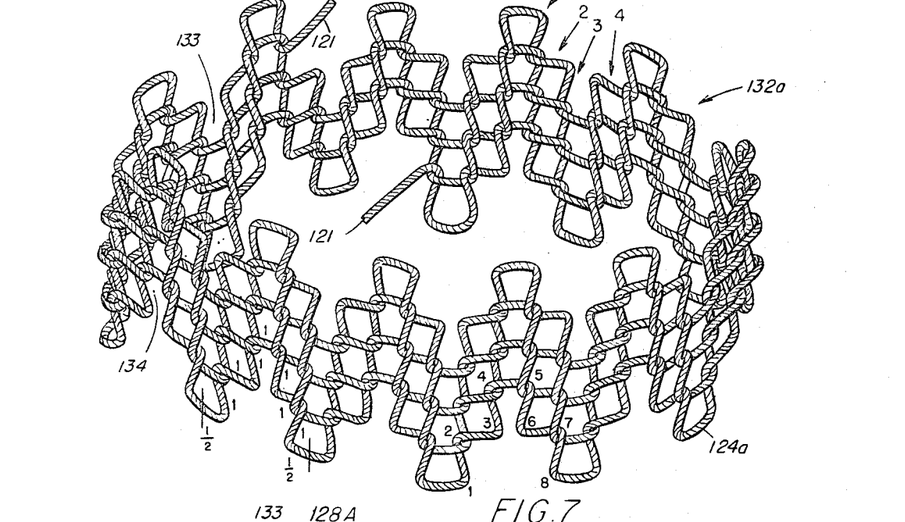
FIG. 7 is an enlarged view of a section of the modified fabric shown in FIG. 6, but made in tubular form.

FIG. 7 shows the same modified weave of FIG. 6 but made in tubular form. Like the basic two column weave shown in FIG. 2, this fabric may be woven into uniform, diminishing or increasing annular dimensions, as will be hereinafter shown. These eight cornered units 133, 134 repeat after eight distances and eight corners, as shown in the lower right hand portion of FIG. 7.

Starting in the middle of an inverted stitch 124a, see the lower left hand portion of FIG. 7, the pattern may be also described as follows: ½ side step, 1 step up, 1 side step, 1 set up, 1 side step, 1 step down, 1 side step, 1 step down and ½ side step before repeating.

Figure 8:
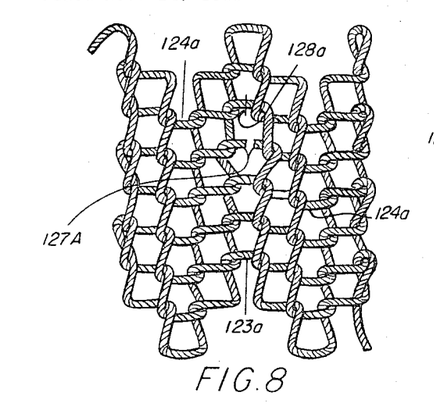
FIG. 8 is an enlarged view of a flat woven section such as shown in FIG. 6 and is the first in a series of figures illustrating the result of breaking a loop in a wale of this interlocked weave.
Figure 9:
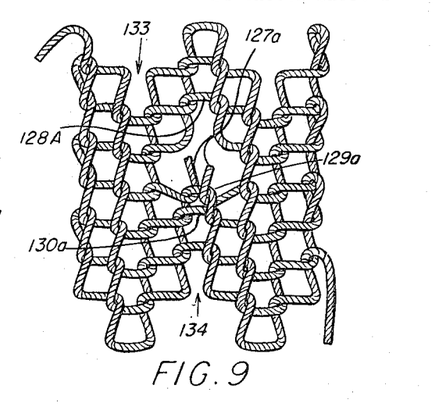
FIG. 9 is a sequence view similar to that of FIG. 8 and shows the ends of the broken thread separated from the horizontal loop directly above it and being drawn together by the horizontal loop directly below it.
Figure 10:
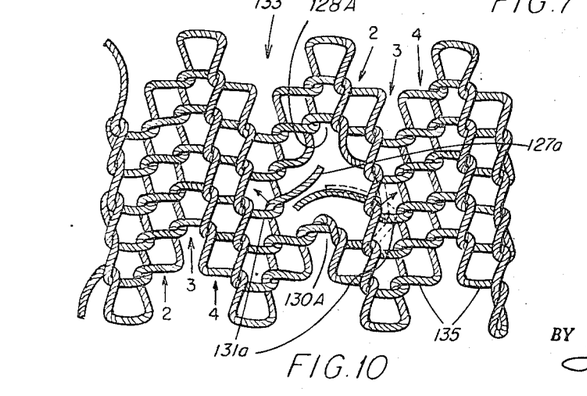
FIG. 10 is a sequence view of those of FIGS. 8 and 9 and shows the impossibility of causing a vertical run in modified as well as the basic weave even if both ends of the broken stitch slip through the tightened loop immediately below. The left-hand broken thread is shown in an intermediate stage which precedes that of the right-hand broken thread shown in the final locked position, see dotted line.

When a break occurs to a loop 123a in the middle column of an inverted funnel-shaped unit 134 the stitch will react in a similar way to a break in a column of loops 123 in the basic weave. Ends 127a, 127a will slip from its higher loop 128a and be initially caught by its lower loop 129a when in turn it tightens around its lower loop 130a, as shown in FIGS. 8 and 9, to prevent the column from running in either direction. FIG. 10 illustrates two sequence positions of the broken ends just previous to being caught by the horizontal loops 131a on either side of the break, tightly closing in the direction of the arrows away from the break. The intermediate stage is shown on the left and in dotted lines, the permanently locked position on the right.

Should a break occur to a loop 124a in the middle column of an upright funnel shaped unit 133 the reaction would be identical to that above described except that it would lock in the reverse direction.

Figure 11:
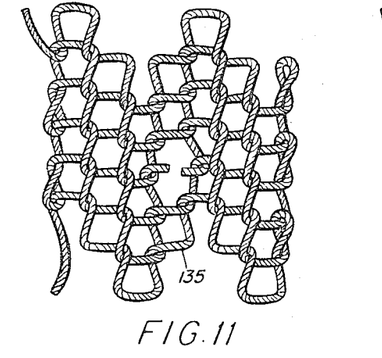
FIG. 11 is an enlarged view of a flat woven section similar to that shown in FIG. 6, but having a thread broken in one of the intermediate columns adjacent the separated wales of the modified weave.
Figure 12:
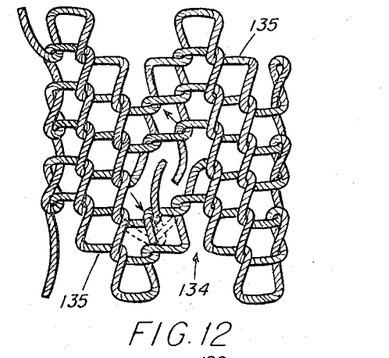
FIG. 12 is a sequence view to that of FIG. 11 showing the initial stage of loop separation before each broken end is clamped by lateral pull of the horizontal interlocked loops in opposite directions. The lower dotted broken thread is shown pulled tight in finally locked position.

If a break occurs in one of the intermediate columns 135, see FIG. 11, the remaining stitches surrounding the break will automatically adjust from normal position to locking position as indicated by the arrows in FIG. 12. The final position of the lower broken end is shown in dotted lines. It is obvious that broken loops occurring in the tubular weaves would be interlocked in a similar manner to those illustrated in the flat weaves. Since a complete unbroken loop will usually measure about 1/50 of an inch in height and 1/64 inch in width including the thread diameter, the vise like action of the adjacent loops will hold broken thread ends in the above described position almost indefinitely.

FIGS. 13 to 16 illustrate knit weave patterns having greater elasticity than the single and double stretch previously shown. Any degree of stretch desired may be obtained by progressively following the same process of increasing the number of step up and step down loops to that shown in FIGS. 6–12.

Figure 13:
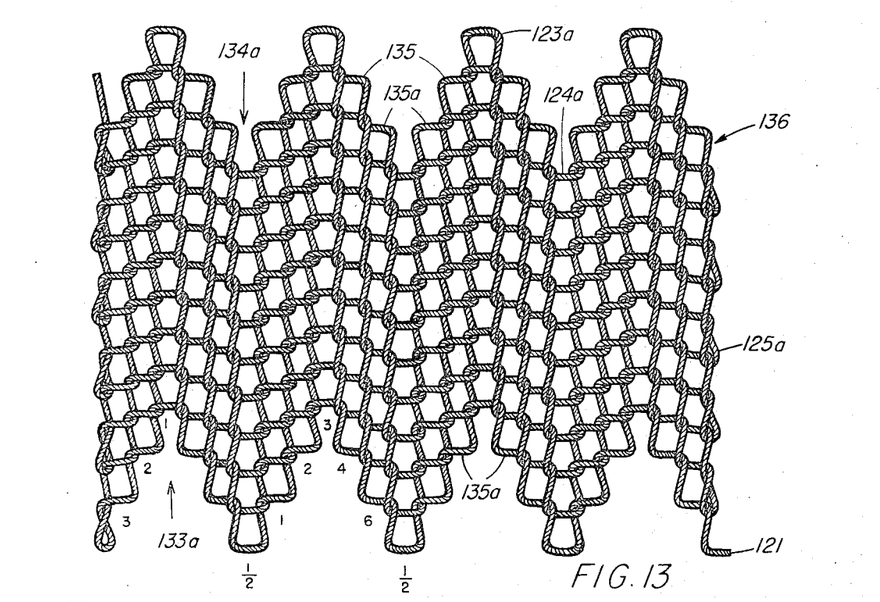
FIG. 13 is an enlarged view of a flat vertically woven section illustrating the same interlocking principle used on three courses of horizontal loops to triple the degree of the basic one course two-way elasticity.
Figure 14:
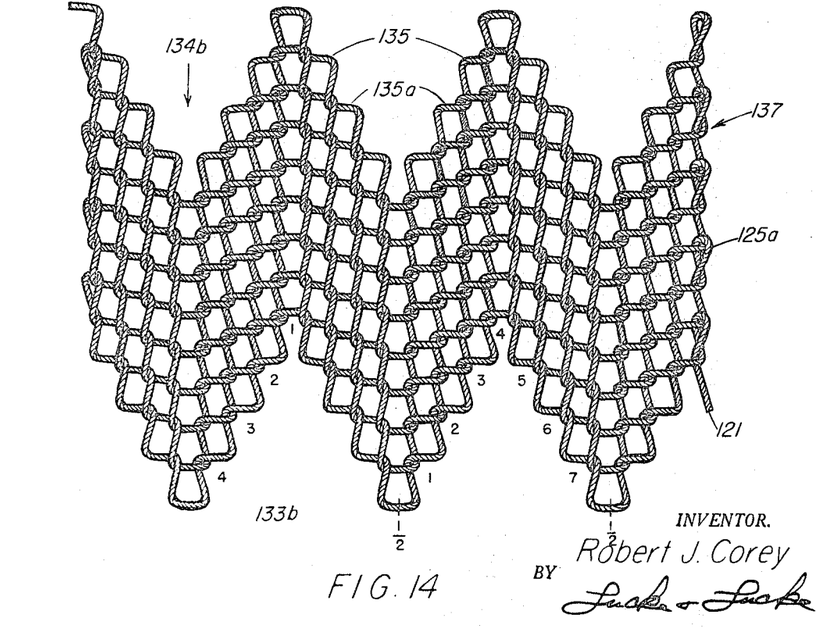
FIG. 14 is a similar view to that of FIG. 13, but showing the knit weave used on four courses of horizontal loops to quadruple the basic two-way elasticity.

It will be noted that the number of columns are increased by two each time the elasticity of the weave is increased one degree, see column 135a in FIG. 13, but that regardless of the degree of elasticity, which could theoretically extend indefinitely, all variations of the modified weave form a series of alternate upright and inverted funnel shaped units, designated 133a–d, respectively.

Thus the triple stretch weave 136 shown in FIG. 13 is woven in a three step up pattern which requires six columns (five whole columns with one-half of a column on each end) to complete each funnel formation 133a, 134a. The quadruple stretch 137 of FIG. 14 made in a four step up, four step down pattern, requires eight columns to complete each cycle, i.e. each 133b or 134b funnel.

Figure 15:
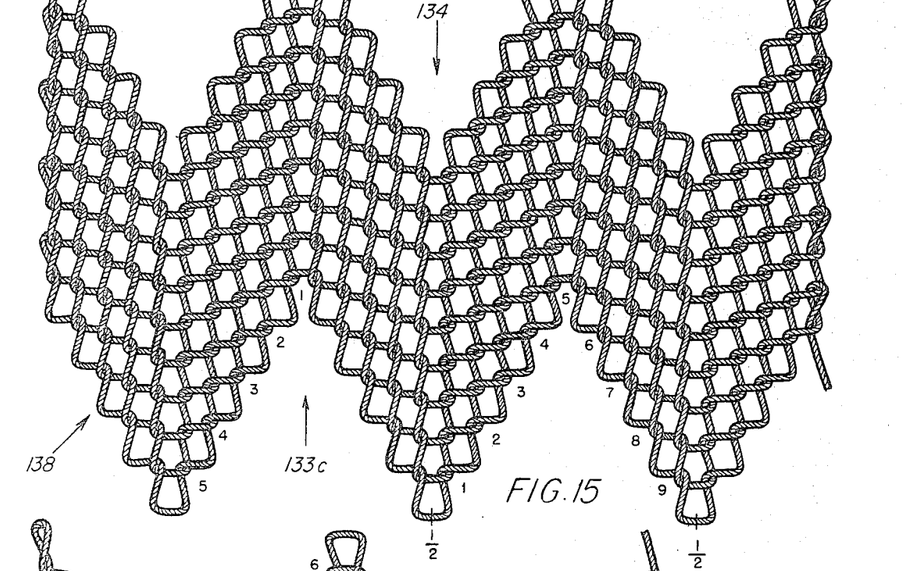
FIG. 15 is a similar view to FIGS. 6, 13 and 14, but illustrating a quintuple two-way stretch knit-weave pattern which is five times more elastic than the basic weave of FIG. 1.
Figure 16:
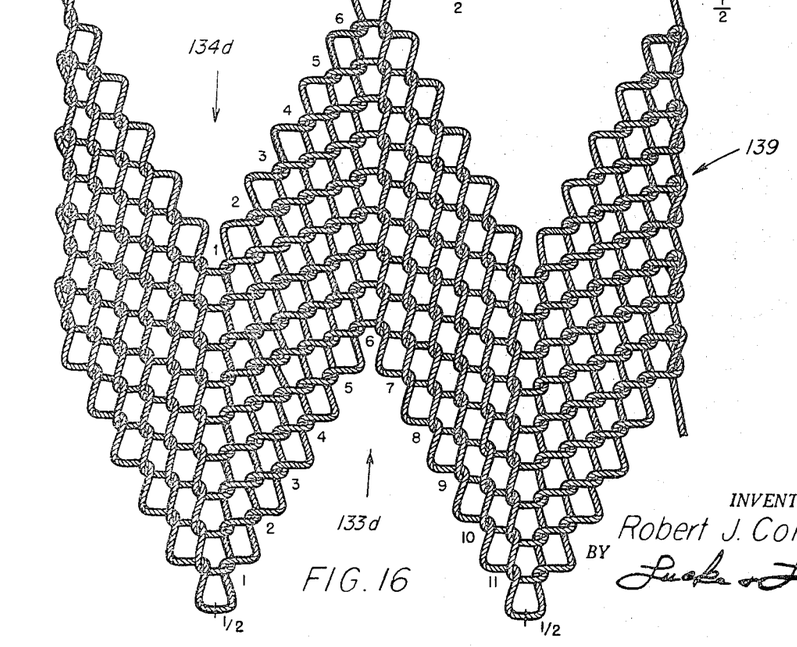
FIG. 16 also is a similar view to the immediately preceding figure, but illustrating a sextuple two-way stretch flat section woven by interlocking six courses of horizontal loops according to the basic principle.

The quintuple stretch fabric 138 is made in a five step up, five step down pattern which takes ten columns to complete each 133c or 134c funnel before the cycle is repeated, as shown in the lower right hand side of FIG. 15. Following the same principle of weaving, sextuple stretch fabric 139 is made on a six step up, six step down basis as indicated in the upper left hand section of FIG. 16. It will be noted from the lower portion of this highly elastic fabric, each funnel formation, 133d, or 134d consists of twelve columns.

As seen from the drawings, the basic and modified weaves illustrated therein are reversible, that is to say, each retains its particular pattern or design regardless of whether or not the fabric is turned from top to bottom or upside down. This important feature greatly enchances the value of the material, increasing the ease with which it may be fabricated and worn.

Having illustrated and described the basic knit weave pattern in flat and tubular form and the general type of patterns obtained by increasing its elasticity, it will now be shown how individual rows of the fabric may be increased or decreased to form any desired shape or configuration. Since a principal use of the invention, however, it expected to be in the manufacture of stockings and other types of hosiery, further phases and examples of the invention are shown and described relative to such articles of manufacture.

Figure 17:
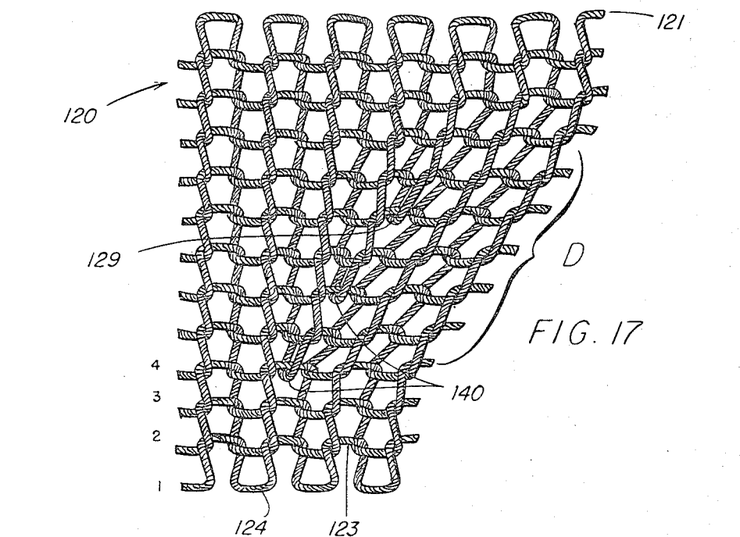
FIG. 17 is an enlarged view of a regular stretch woven section showing the increase and decrease of single thread stitches which may be used to form the calf and toe portion of a stocking.

The piece of single stretch fabric 120 shown in FIG. 17 has been increased from a bottom row of seven oppositely directed columns of loops, 123, 124 to a top row of thirteen such loops. The amount of increase will depend upon the size and shape of the article to be produced. Starting with the fourth row from the bottom and in a series of every other row thereafter, an extra loop 140 is pulled through loop 129 immediately beneath it in the preceding row to form a progressive two stitch increase. A progressive two stitch decrease is obtained by the opposite method or reverse operation as will be apparent from turning this figure upside down. These increasing and decreasing stitches can of course be used whenever applicable, such as to form the calf or toe of a stocking.

Figure 18:
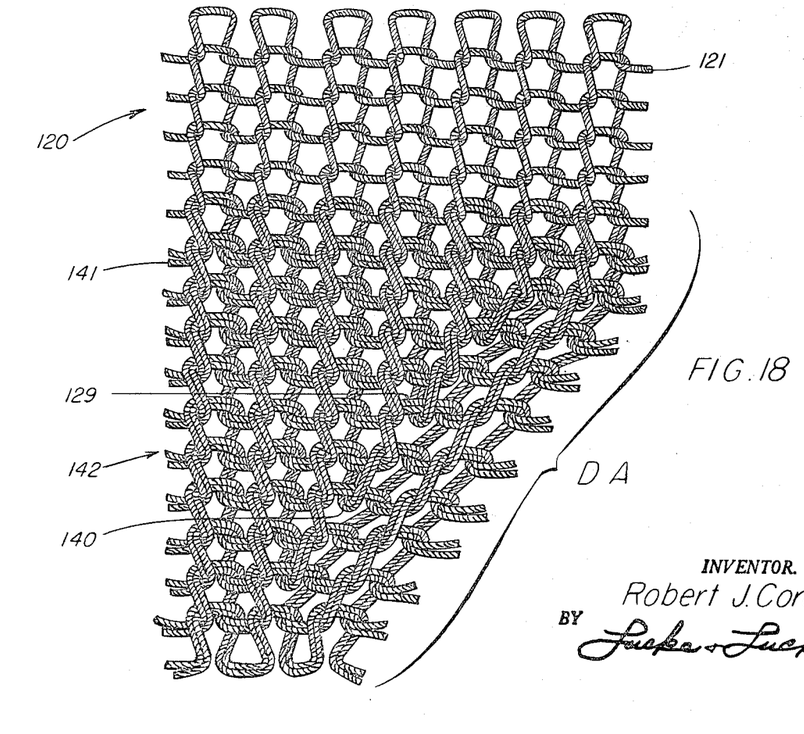
FIG. 18 is an enlarged view of a regular stitch woven fabric showing the use of multiple threads for greater support and the manner of increasing and decreasing stitches to form a toe section, only half of which is shown.

FIG. 18 shows one or more threads 141 added to the original basic thread 121 to obtain increased strength for sections subject to hard wear such as the toe, sole and heel of a stocking. This figure also illustrates the similarilty of increasing and decreasing a multiple thread section 142 to one of single thread 120. Although only one additional loop 140 is here shown in each alternate row, it is understood that any desired number of new loops in each row may be formed by the same process.

Figure 19:
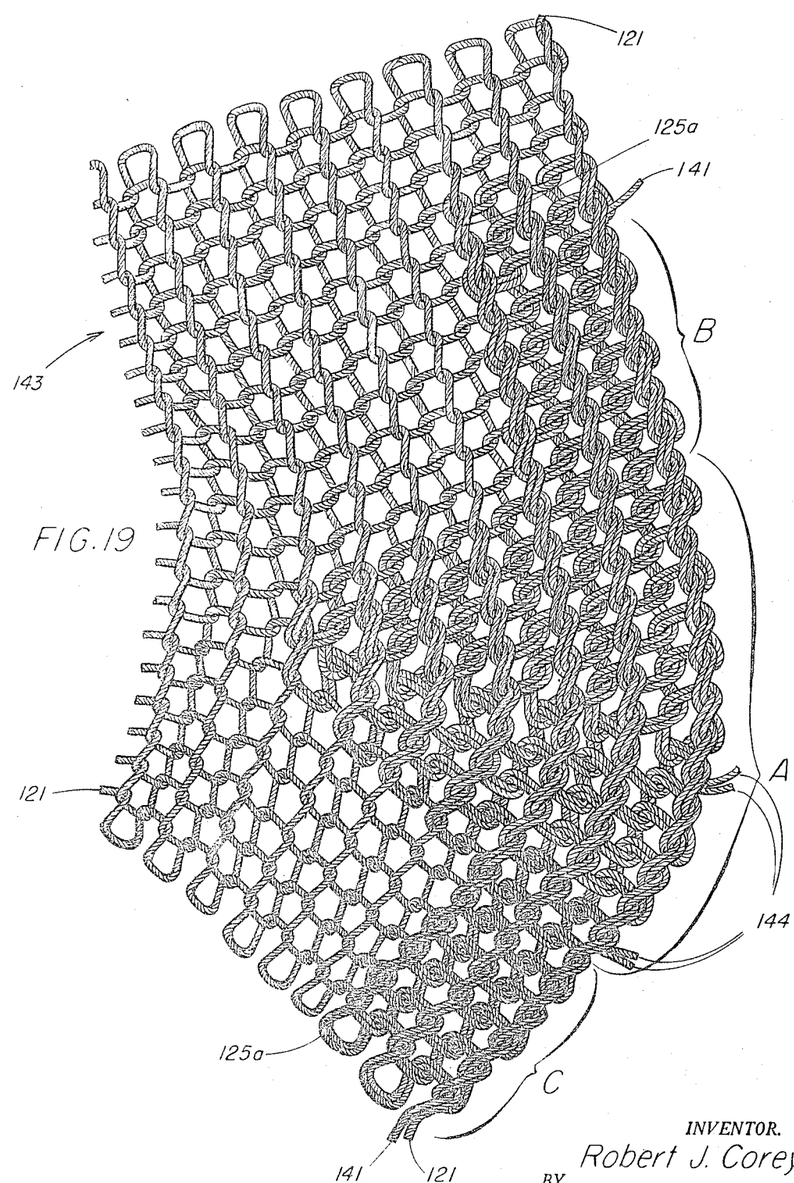
FIG. 19 is an enlarged sectional view of a flat woven stocking showing the manner of increasing and decreasing multiple thread stitches to form a sole, ankle and inserted heel support.

A flat stocking is illustrated in FIG. 19. The stocking is woven throughout with a single basic thread 121. To this is added a multiple thread 141 which reinforces the ankle portion B and sole portion C. An inner selvage 125a is formed where the reinforced portions end. The heel section A is woven into the reinforced body portion by means of one or more additional threads 144 creating an inserted triangular heel section.

Figure 20:
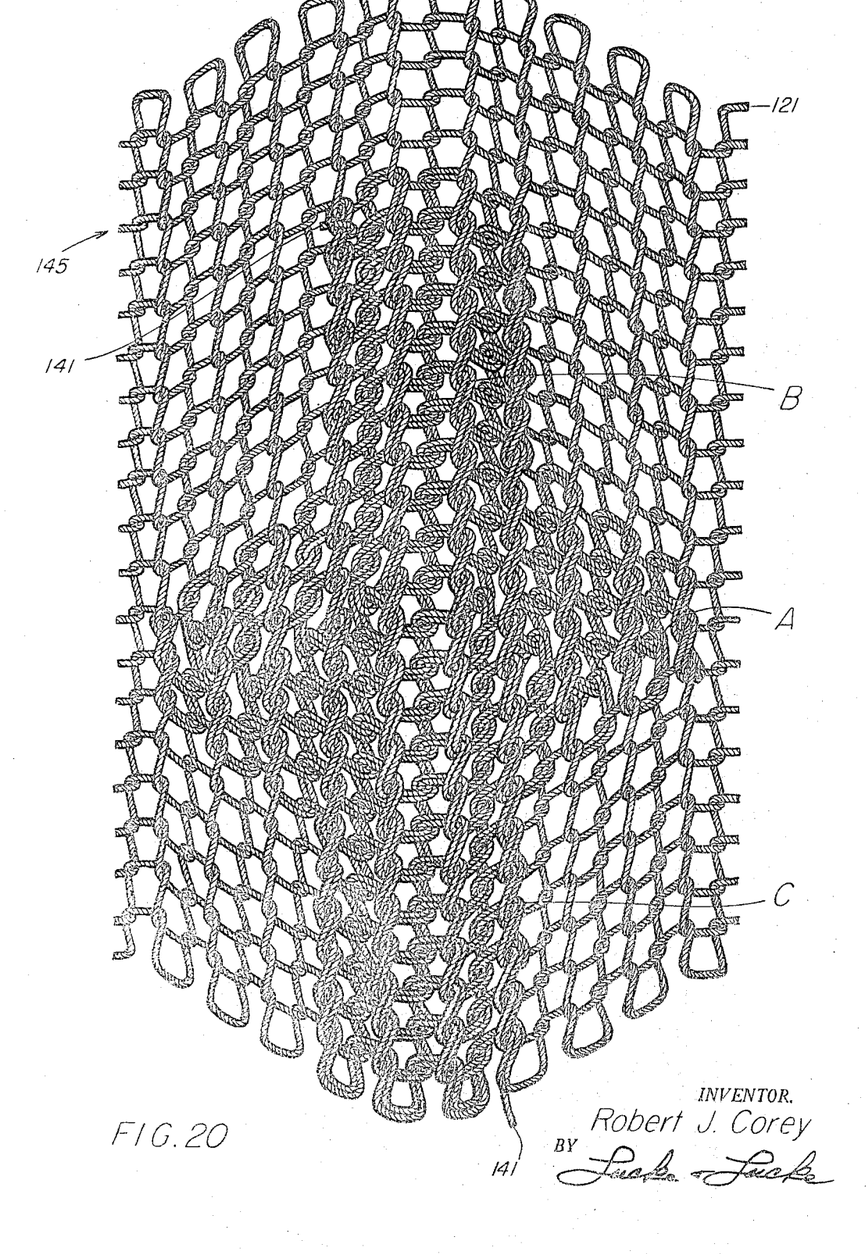
FIG. 20 is an enlarged sectional view of a tubular woven stocking showing the sole, ankle and inserted heel support.

The method of forming integral heel, sole and ankle portions designated A, B, C, respectively, by introducing an additional thread or threads 141 to a single stretch tubular woven stocking 145 is illustrated in FIG. 20. Multiple threads 141 not only cooperate with basic thread 121 to reinforce the sole and ankle portions B and C, but also form the cupped heel portion A into the substantially diamond shaped separation provided therefor. This is merely an example, however, since only twenty eight rows are shown in the center and twenty rows on the edges, whereas in actual practice there would be hundreds of rows in a stocking fabric.

Figure 21:
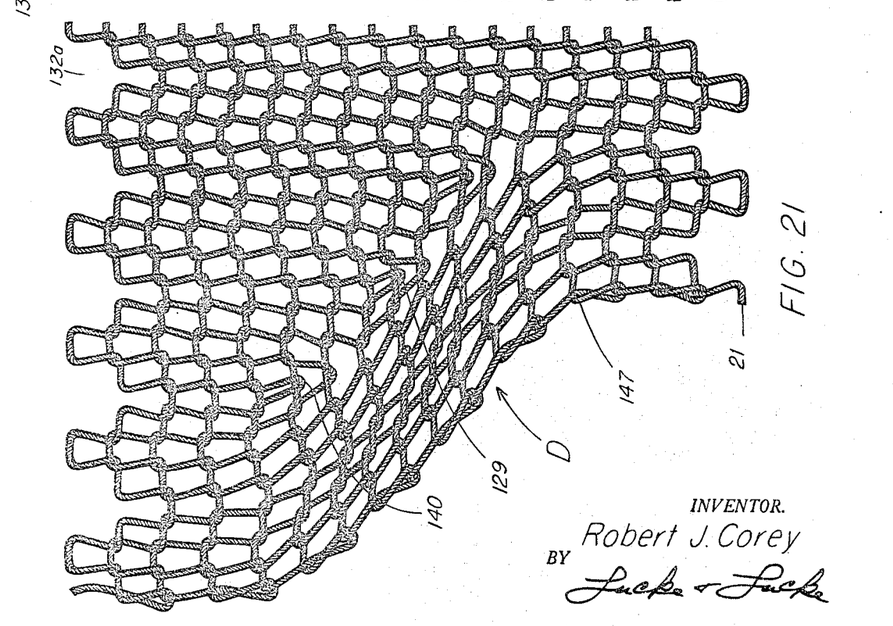
FIG. 21 is an enlarged sectional view of a double stretch, single thread stocking with increased stitches to form the calf portion thereof.
Figure 22:
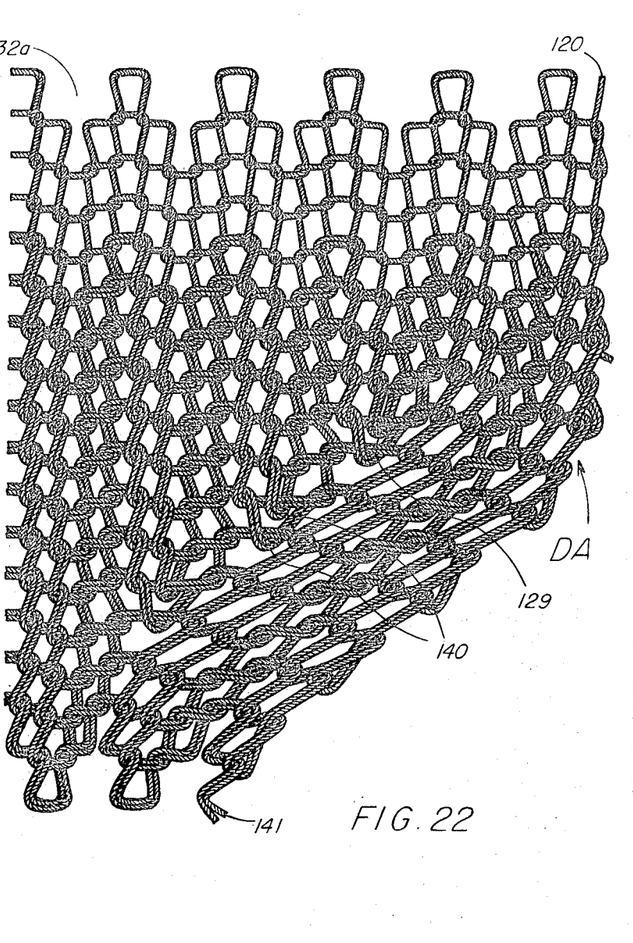
FIG. 22 is an opposite sectional view of a weave to that of FIG. 21 showing the manner in which additional threads may be added for local areas requiring increased support.

FIGS. 21 and 22 illustrate an increasing and decreasing double stretch woven fabric 132a forming the calf portion D or toe portion DA of a stocking or wherever applicable. A single thread double stretch woven stocking 147 is shown in FIG. 21. FIG. 22 shows the opposite view of a similar fabric in which multiple threads (here shown as single thread 141 for ease of illustration) have been introduced to fortify the toe portion thereof.

An increase in the number of stitches is obtained by pulling an extra loop 140 through a lower loop 129 in the preceding row. Conversely, a decrease in the number of stitches is effected by pulling two loops together into one loop from the preceding row. As in FIGS. 17 and 18, the decreasing of the stitches may be readily discerned by turning FIGS. 21 and 22 upside down. Every increased double stretch stitch adds four columns to the weave and every increased single stretch stitch adds two additional columns.

Figure 23:
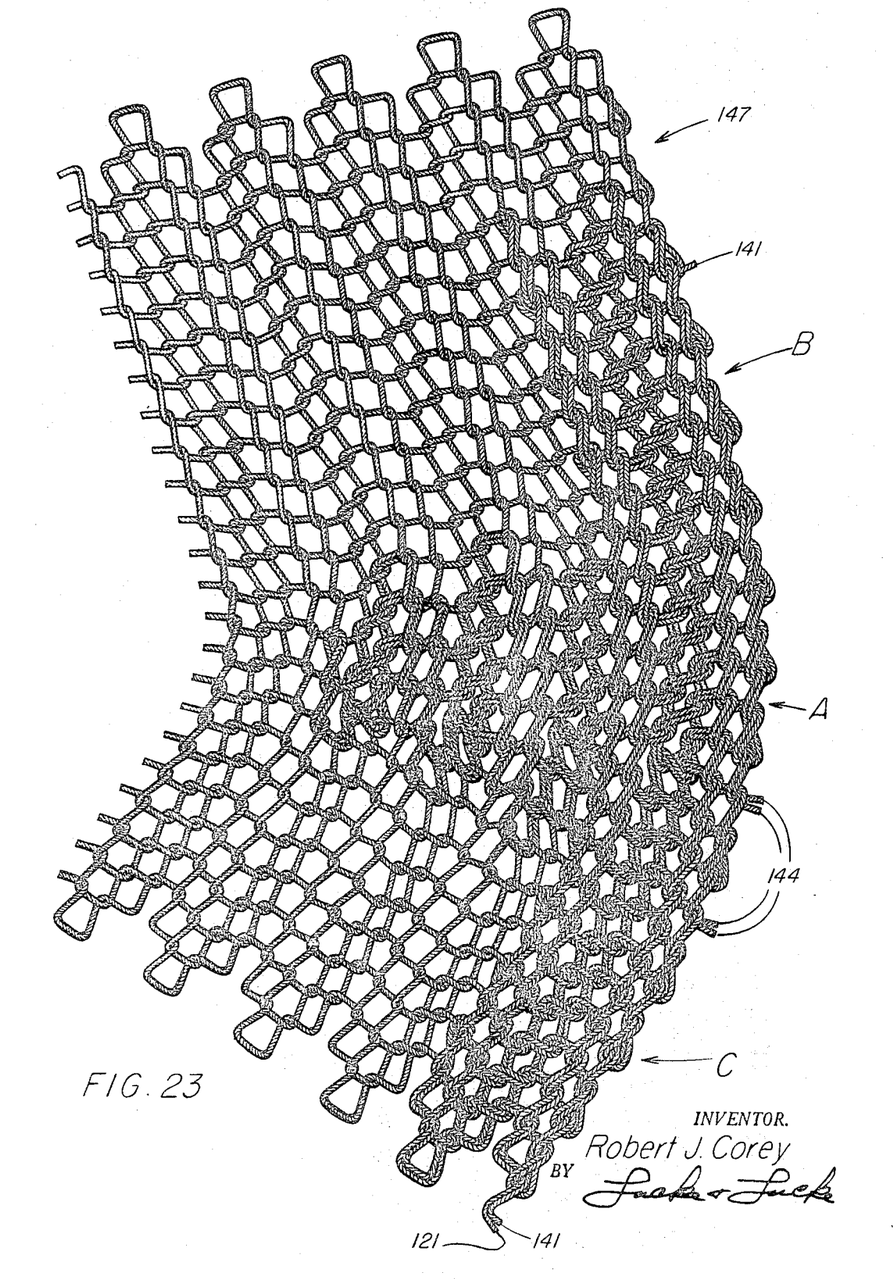
FIG. 23 is an enlarged partial view of a flat woven, double stretch stocking illustrating the sole and ankle support with inserted heel.

It will be seen from FIG. 23 that the multiple thread heel portion A is knit woven with a double stitch into the reinforced ankle B and sole C portions of the double stretch flat stocking 147 substantially the same as the single stretch heel portion is woven into the single stretch flat stocking 143 shown in FIG. 19.

Figure 24:
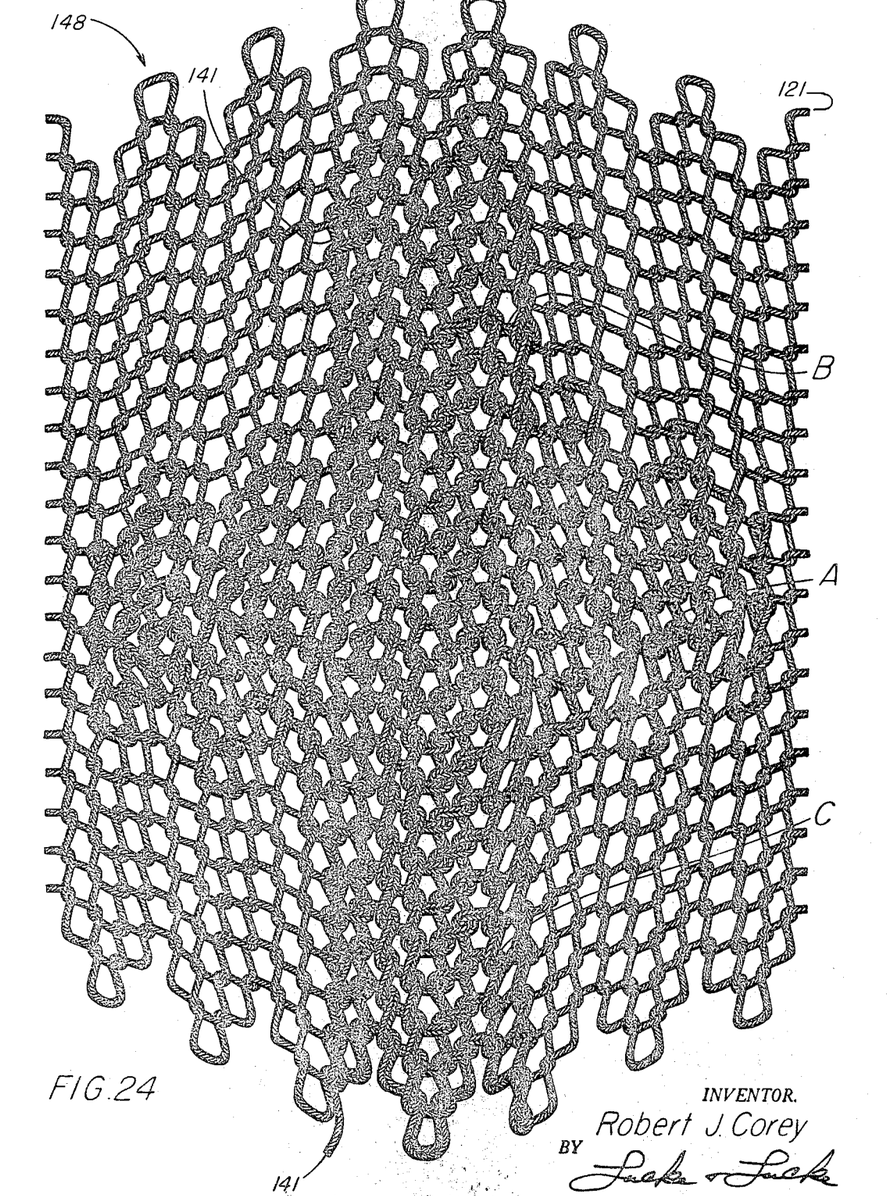
FIG. 24 is an enlarged sectional view of a tubular woven, double stretch stocking illustrating a multiple thread sole and ankle support with inserted heel.

An integral reinforced sole, heel and ankle portion ABC is made with an additional thread 141 knit woven with the single basic thread 121 in the double stretch tubular stocking 148 shown in FIG. 24 in a similar manner to the single stitch tubular stocking 145 illustrated in FIG. 20.

Figure 25:
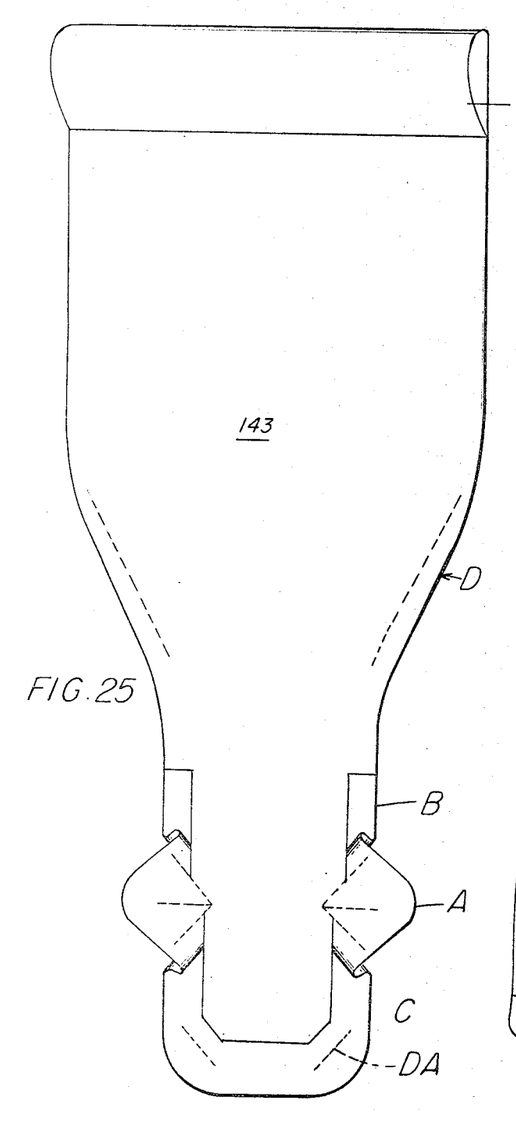
FIG. 25 is a reduced plan view of a flat woven stocking prior to seaming.
Figure 26:
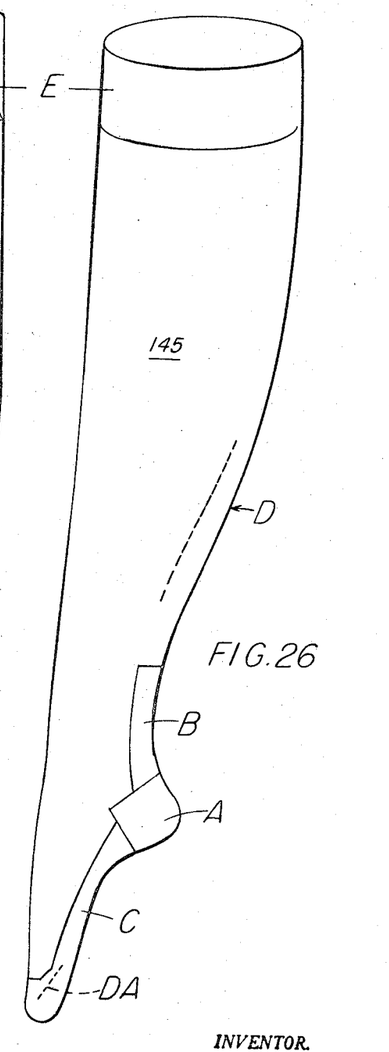
FIG. 26 is a perspective view of a tubular woven stocking.

Due to the minute size of the innumerable stitches actually used in hosiery manufacture, it has been necessary to show these stitches on a greatly enlarged scale in all of the previous illustrations and to simplify the general weaving pattern. The end product, however, of a flat woven stocking 143 before seaming is shown in FIG. 25; and that of a tubular stocking 145 is illustrated in FIG. 26 with the respective heel, ankle, sole, toe and calf portions clearly indicated.

Figure 27:
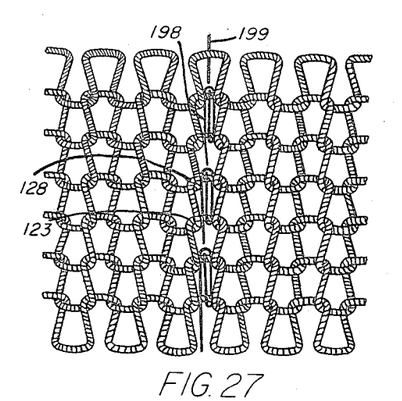
FIG. 27 shows blocking of the final column in a seamed tubular stocking.

When completed, the tightened blocking seam will appear as shown in flat form in FIG. 27. This type of blocking stitch is used mostly for full fashioned stockings.

Figure 28:
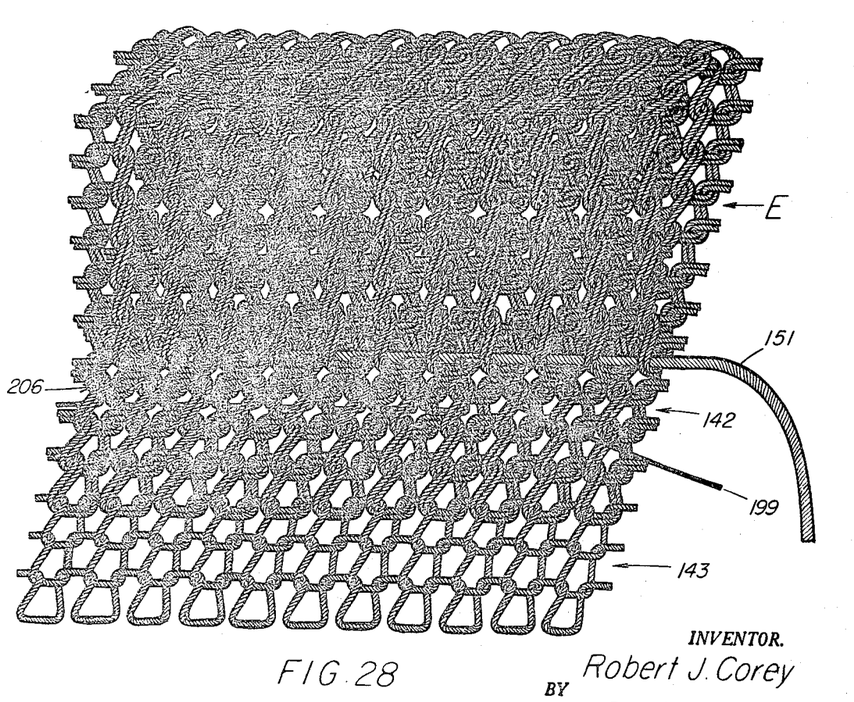
FIG. 28 is a partial view of a knit weave fabric showing the hemming of any knit weave article.

FIG. 28 shows a hem E which is used in all types of horizontally woven stockings. That is, all stockings are hemmed the same way, whether of single or multiple ply and regardless of the degree of elasticity. The portion at the right of this figure is shown in the first stage of being folded over with the selvage thread 151 still running through it. The middle portion of the drawing shows the selvage thread being pulled out after the end of the folded hem portion E has been stitched to the under-lying reinforced body fabric 142. And on the left hand side of FIG. 28, the hemming operation 206 is shown in finished form. Before the selvage thread is completely withdrawn, the toe portion of the stocking will also be closed in the usual manner of conventional stockings.

Figure 29:
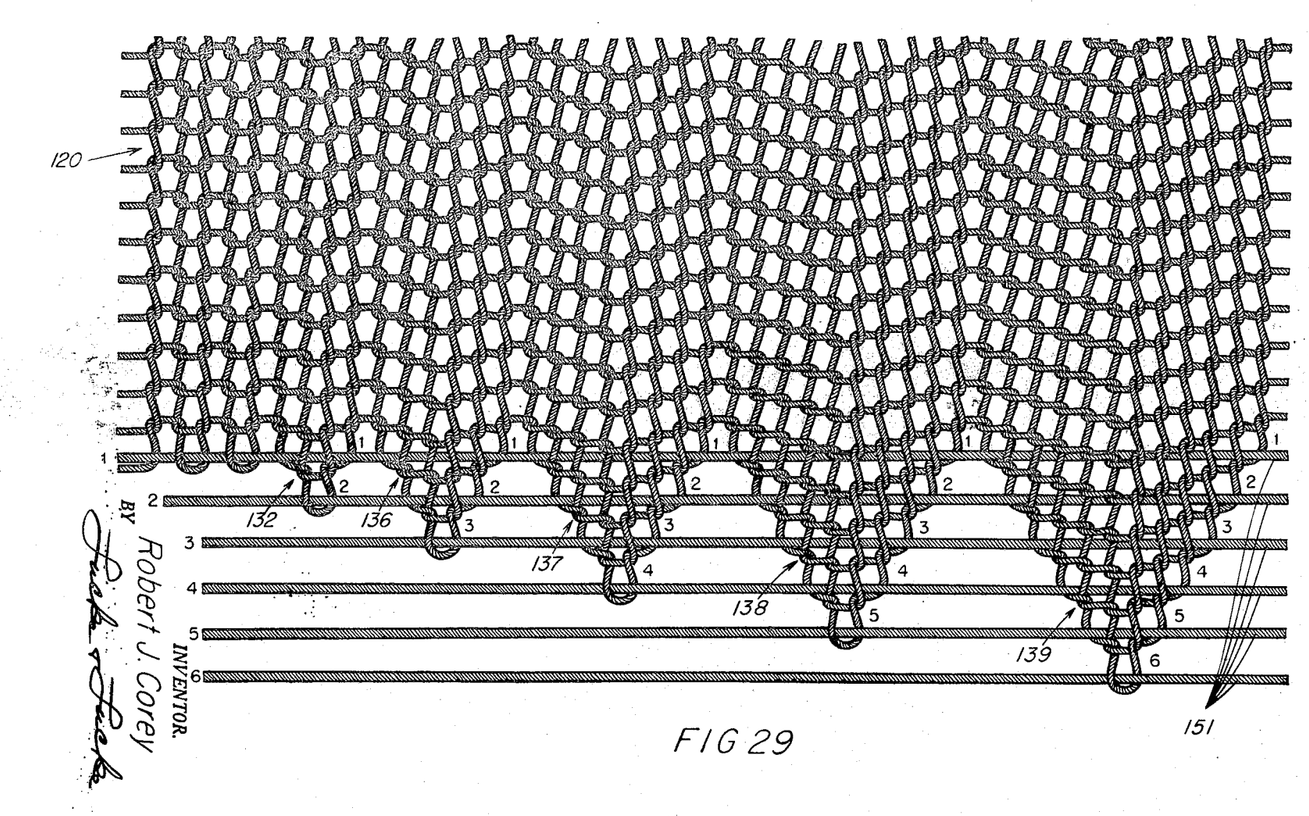
FIG. 29 is a plan view of a single piece of fabric in which the elasticity of the material can be progressively increased from single to sextuple stretch ad infinitum.

A multi-stretch fabric is illustrated in FIG. 29. Here a single piece of fabric is shown ranging from a single to a six stretch and incorporating the weaves shown separately in FIGS. 1, 6 and 13–16. It will be understood, however, that the elasticity could be increased to any practical degree by continuing to increase the same weaving steps. A selvage thread 151 must be provided to support the irregular stitches in the last row of each modified phase of the elastic fabric. Thus six selvage threads 151 are required for a six step down, 6 step up sextuple stretch fabric 139, only 5 for a quintuple 138 and progressively less for each decreased degree of stretch to only one selvage for the regular, even stitches of the single stretch fabric 120. This increased and decreased stretchable fabric is applicable to both flat and tubular types of construction and may be woven into any shape or form. Some of the uses for multi-stretch fabric might include a stocking with a single stretch body portion having six stretch knee, and heel portions. It could also be made into form fitting head to toe garments having areas of various elasticity located at appropriate anatomical positions.

In addition to hosiery this new weave lends itself to the making of piece goods by the yard, finished, ready to wear garments, and many other items of unlimited scope. It also lends itself to "woven in" decorations, invisible seaming on the straight and on the bias of the weave and many other novel variations in structure as well as all those known to the tricot trade.

It will be apparent from the drawings that the basic and modified weaves illustrated therein are reversible, that is to say, each retains its particular pattern or design regardless of whether or not the fabric is turned from top to bottom or upside down. This important feature greatly enhances the value of the material by increasing the ease with which it may be fabricated and worn.

This new weave can be woven of any type of natural or synthetic yarns, from the finest to the grossest and from the thickest to the thinnest. Also, this weave can be made into any desired type of garment or knit-woven article.

The forms of the invention here described and illustrated are presented merely as examples of how the invention may be embodied and applied. Other forms, embodiments and applications of the invention, coming within the proper scope of the appended claims, will, of course, suggest themselves to those skilled in the art.

I claim:
1. A reversible, non-run, knit woven flat fabric comprising alternate courses of inverted and non-inverted loops in which alternate wales thereof run in opposite directions with at least one intermediate step up and step down loop disposed on either side of each said inverted and non-inverted loop to form said knit woven fabric of at least double stretch, each of said loops being interlocked twice by loops in each succeeding course.

2. A reversible, non-run knit woven fabric comprising some courses of one step up, one step down single stretch open loops in which alternate wales run in opposite directions and other courses of at least two steps up and steps down multiple stretch closed loops disposed between said open loops to form at least double stretch sections of said fabric, each of said loops being interlocked twice by loops in each succeeding course.

3. A new article of manufacture comprising a reversible, non-run, knit woven garment made from at least one basic thread having courses of increasing and decreasing numbers of selected steps up and steps down loops, each of said loops being interlocked twice by loops in each succeeding course.

4. A new article of manufacture comprising a figure-conforming garment made from at least one basic thread having rows of increasing and decreasing numbers of variable stretch step up and step down loops, multiple threads reinforcing said basic thread at predetermined locations, said threads forming integrally knit woven straight and shaped sections of said garment, each of said loops being interlocked twice by loops in each succeeding row.

5. A new article of manufacture comprising a reversible, non-run, knit woven tubular fabric made from at least one thread, said thread being formed into rows of knit-like loops, each of said loops being interlocked twice with each successive horizontally and vertically disposed loop, and a blocking seam securing the last row of said tubular fabric.

6. Reversible, non-run, knit woven hosiery comprising toe, sole, heel, calf, hem and connecting sections, each of said sections being formed of at least one thread into courses of alternate inverted and non-inverted loops in which alternate wales thereof run in opposite directions, each of said loops being interlocked twice by loops in each succeeding course, and a non-run seam securing said sections together.

7. Hosiery according to claim 6, wherein at least one intermediate step up and step down loop is disposed on either side of said inverted and non-inverted loops to form said knit woven hosiery of at least double stretch.

8. Hosiery according to claim 6, wherein at least some of said sections are provided with at least one intermediate step up and step down loop disposed on either side of said inverted and non-inverted loops to form at least some double stretch sections of said hosiery.

9. A reversible, non-run, knit woven, tubular fabric comprising alternate courses of inverted and non-inverted loops in which alternate wales thereof run in opposite directions with at least one intermediate step up and step down loop disposed on either side of each said inverted and non-inverted loop to form at least double stretch tubular knit woven fabric, each of said loops being interlocked twice by loops in each succeeding course, and a blocking seam to secure the last wale of said tubular fabric.

References Cited

UNITED STATES PATENTS

| | | | |
|---|---|---|---|
| 1,721,154 | 7/1929 | Huse | 66—169 |
| 2,060,882 | 11/1936 | Lockhead | 66—169 |
| 2,148,517 | 2/1939 | Wesseler | 66—1 |
| 2,295,793 | 9/1942 | Kaufman | 66—169 |
| 2,590,914 | 4/1952 | Adams | 66—1 |
| 3,222,888 | 12/1965 | Turner | 66—1 |

FOREIGN PATENTS 1,106,025  5/1961  Germany.

OTHER REFERENCES

Miller, M. C.: Principles of Knitting, New York, McGraw-Hill, 1931, Chap. XIV, page 153, TT685M6. (Copy in Group 441.)

MERVIN STEIN, *Primary Examiner.*

DONALD W. PARKER, RONALD FELDBAUM,
*Examiners.*